United States Patent Office 3,450,069
Patented June 17, 1969

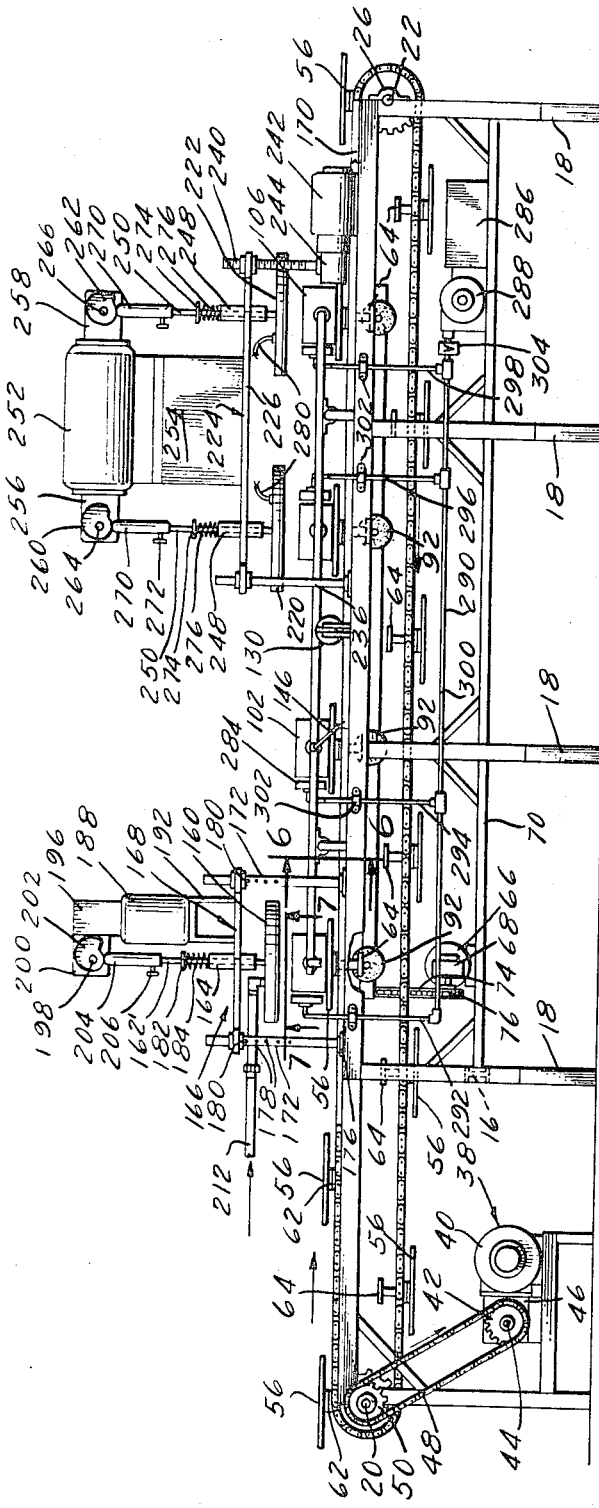

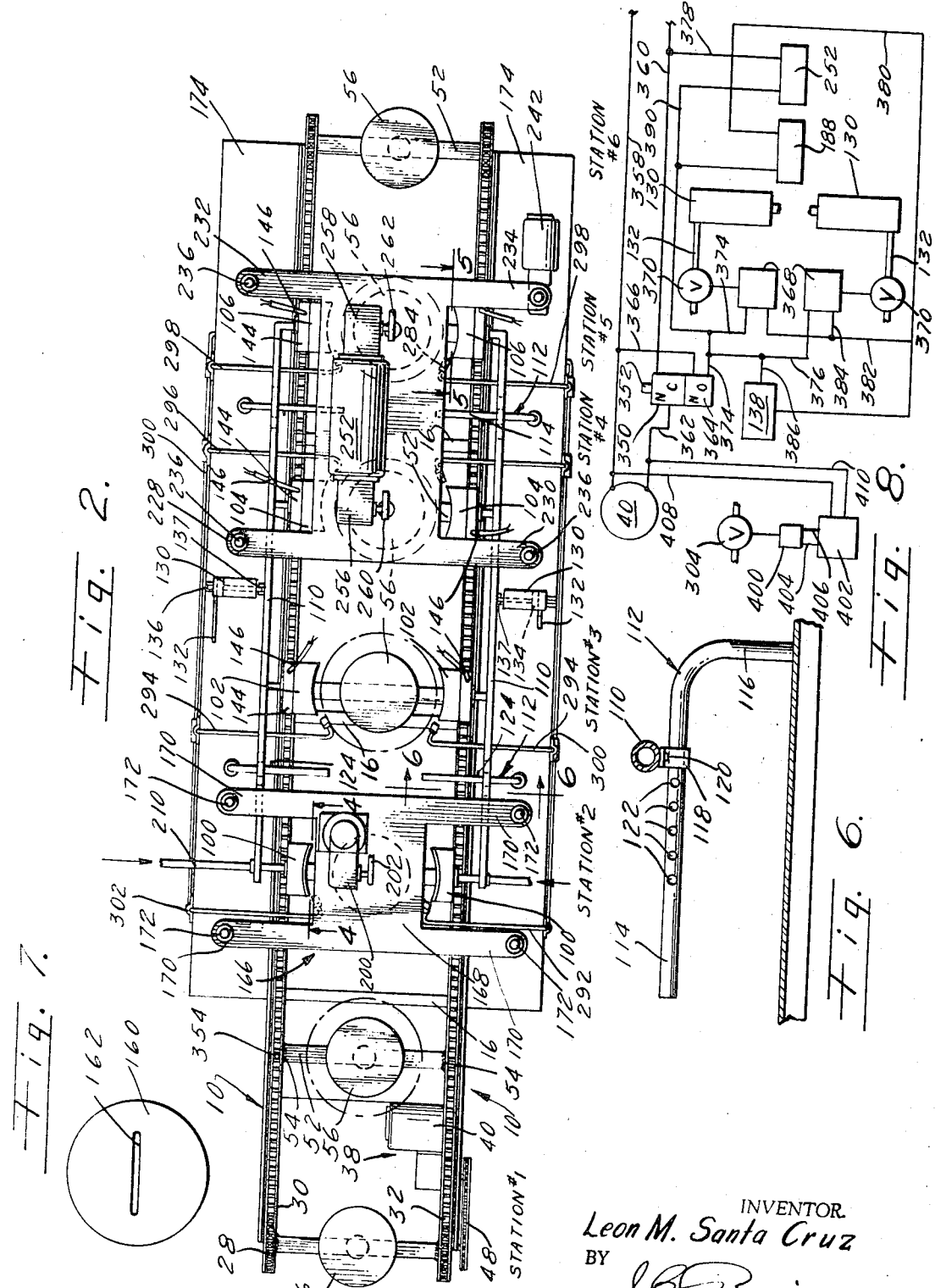

3,450,069
CAKE ICING APPARATUS
Leon M. Santa Cruz, 7067 Pico Vista Road,
Pico Rivera, Calif. 90660
Filed Oct. 16, 1967, Ser. No. 675,696
Int. Cl. A21c 15/00
U.S. Cl. 107—4
11 Claims

ABSTRACT OF THE DISCLOSURE

An apparatus for automatically applying icing or frosting to cakes and spreading the icing on the sides and on the top of the cakes. Sprays are positioned adjacent the icing spreaders for spraying a mixture of air and water onto the spreading surfaces of the spreaders when they are disengaged from the cakes to clean the spreader surfaces.

Background of the invention

*Field of the invention.*—While the invention has particular utility in connection with apparatus for icing or frosting layer cakes, and is shown and described in such connection, it is to be understood that its utility is not confined thereto.

*Description of the prior art.*—The present invention is for use in bakeries, particularly large bakeries. As far as the state of the prior art known to applicant, icing cakes in bakeries is a manual procedure. That is the icing of cakes, particularly the spreading of the icing, is done by hand.

There is one arrangement for icing cakes of which applicant is aware which includes a rotatable table on which cakes are placed and specific steps or operations are performed by hand at respective stations. At each station there is an operator who performs an operation and as each operation is completed the table is rotated an amount to take the cake to the next station where the next operation is performed. For example, at one station there is a preliminary application of icing to the cakes. The table is then rotated to the next station where the icing already applied is smoothed. While this is being performed the operator at the first station applies icing to the cake at this station. The table is then rotated another increment and the operator at the third station further smooths the icing already applied while the operators at the first and second stations perform their operations. There are, of course, enough stations and operators at such stations to finish the icing of the cakes and the marking and/or decorating thereof. While there is a rotatable table used, the icing, smoothing of the icing and decorating of the cakes is done manually, that is by hand.

As will be obvious from the foregoing, one of the primary problems of the prior art is the great amount of hand work required in the icing and decorating cakes. Because of this factor the cost of icing and decorating cakes is relatively high. Also, because of the large amount of hand work the icing and finishing of cakes consumes a considerable amount of time.

Brief summary of the invention

The present invention solves the above problems and difficulies thereof by providing a mechanism or apparatus that automatically moves the cakes from station to station, applying icing to the cakes at the first station, performing smoothing operations at subsequent stations, combing the icing at one station, an imprinting or otherwise putting a decorative pattern or the like on the cakes.

There is also apparatus for cleaning the surfaces of the smoothing devices or irons of icing after such surfaces have been in engagement with the cakes and then disengaged. In other words the icing contacting surfaces of the irons are cleaned when such surfaces are disengaged from the cakes.

Objects of the invention

It is an object of the present invention to provide apparatus for automatically icing and finishing cakes.

Another object of the invention is to provide apparatus of this character that eliminates hand labor in applying icing to cakes and smoothing said icing and finishing the icing and decorating of the cakes.

Still another object of the invention is to provide apparatus of this character that substantially reduces the cost of icing and finishing cakes.

A further object of the invention is to provide apparatus of this character that substantially reduces the time necessary to ice and finish cakes so as to greatly increase production of finished cakes.

The characteristics and advantages of the invention are further sufficiently referred to in connection with the following detailed description of the accompanying drawings which represent one embodiment. After considering this example skilled persons will understand that many variations may be made without departing from the principles disclosed, and I contemplate the employment of any structures, arrangements or modes of operation that are properly within the scope of the appended claims.

Referring to the drawings, which are schematic and for illustrative purposes only:

FIG. 1 is a side elevational view of apparatus embodying the present invention;

FIG. 2 is a top plan view of same;

FIG. 3 is an enlarged sectional view taken on line 3—3 of FIG. 1;

FIG. 4 is an enlarged view taken from line 4—4 of FIG. 2 showing the slot through which icing is discharged onto the periphery of a cake;

FIG. 5 is an enlarged view taken from line 5—5 of FIG. 2 showing the face of one of the combing irons;

FIG. 6 is an enlarged sectional view taken on line 6—6 of FIG. 2;

FIG. 7 is an enlarged view taken from line 7—7 of FIG. 2; and

FIG. 8 is a wiring diagram of the electrical system for controlling the automatic operation of the apparatus.

Referring more particularly to the drawings, there is shown cake icing or frosting apparatus having a support frame or supporting means comprising parallel, longitudinally extending frame members 10 spaced laterally apart. These members may be of any suitable cross sectional shape but are shown as right angle irons with one arm, indicated at 12, at the top, as best shown in FIG. 3, the other arm 14 depending from the outer edge of the top arm.

There are transverse members 16 which interconnect the members 10 at longitudinally spaced locations, the ends of said transverse members 16 being secured to the longitudinally extending members 10 by welding, brazing or any other suitable means. Legs 18 support the members 10 and the upper ends of said legs are secured to the longitudinally extending members 10 by welding, brazing or other suitable means. the legs being spaced apart longitudinally of the members 10.

There is cake carrying and transporting mechanism which includes transverse shafts 20 and 22 at the respective ends of the frame, each shaft is rotatably mounted to the legs of the frame by means of suitable bearings. The shafts are similarly mounted, the arrangement for rotatably mounting the shafts is best shown in FIG. 1 wherein the shaft 22 is secured by brackets 26, there being such a bracket for each end of the shafts. The sprocket wheels at respective sides of the frame being aligned with each other.

Adjacent each end of each shaft a sprocket wheel 28 is secured to rotate with its shaft and there are endless chains 30 and 32 on respective aligned sprocket wheels, the top portions of the chains riding and moving on the top arms 12 of the respective longitudinally extending members 10 while the lower portions of the chains move in the opposite direction. More particularly the top portions of the chains on the top arms 12 of the members 10 move from the starting end of the apparatus toward the terminal end thereof and the lower portions of the chains move from the terminal end toward the starting end.

There is means for operating the chains, said means being indicated generally at 38. Chain operating means 38 comprises an electric motor 40 driving a sprocket 42 from a shaft 44 of a speed reduction gear system enclosed in the gear box 46, said gear system being of any conventional type and need not be discussed in detail. The sprocket 42 is connected by means of a chain 38 with a sprocket 50 attached to the shaft 20.

There are pluralities of cross members for table supporting members 52. The respective ends of which are secured to the chains and are spaced apart longitudinally of the chains a predetermined distance.

Each member 52 is provided with a table 56 on which cakes are disposed during the frosting or icing operations. The tables 56 are circular and each table is mounted at the upper end of an axial shaft 58 which extends downwardly to an opening provided therefor in its respective member 52. There is a tubular bearing 66 secured to the under side of the member 52 by welding or other suitable means and shaft 58 extends downwardly through said bearing. There is a table supporting bearing 62 between the table and the member 52 and at the lower end of the shaft 68 there is a disc 64 which is secured to said shaft.

Means for rotating the plates 56 comprises an electric motor 68 mounted on a frame member 70. Motor 68 is connected to a shaft 72 by means of a chain 74 driven by a sprocket 76 on the motor shaft and connected to said shaft 72 by means of a sprocket, not shown.

The apparatus has a plurality of stations whereat the plates stop and are rotated. At each station there is a bracke 80 secured to an adjacent longitudinally extending chain member by welding or other suitable means and each bracket 80 includes a depending arm 82 having an opening therethrough for horizontally extending shaft 84 which is retained in position by means of discs 86. At the outer end of the shaft 84 is a gear 88 which meshes with and is driven by a worm gear 90 suitably positioned on shaft 72 which extends longitudinally of the apparatus. On the inner end of shaft 84 is a driver disc 92 so positioned that when a plate 56 reaches a station the driven disc 64 peripherally engages the driver disc 92 to effect rotation of the driven disc 64 and hence of the table of plate 56. There is a table driving mechanism for frictionally driving the respective tables at each station.

At the stations 2, 3, 4 and 5 there are what will be termed irons, there being oppositely arranged irons at each station, said irons being indicated at 100, 102, 104 and 106. Irons 100 are icing applying irons which are adapted to apply icing to the cylindrical or peripheral portion of the cakes. Irons 102 are smoothing irons and irons 104 are also icing smoothing irons. Irons 106 perform the finishing operation and as shown comprise combing irons although any other suitable type of finishing irons may be used.

The irons are attached to longitudinally extending forked members 110 at the respective sides of the apparatus, the longitudinally extending iron support members are slidably attached to brackets which may be of any suitable cross sectional shape but are shown as being round, the brackets being indicated generally at 112.

Bracket 112 has horizontal parts 114 and vertical parts 116, lower ends of said vertical parts being secured to the top arms 12 of the frame by means of webbing or other suitable means. There are connecting members 118 that extend about the horizontal portion 114 of the brackets 112 and are secured to the iron support members 110 by means of screws 120 or other suitable means. The connections between the members 110 and the horizontal portions 114 of the brackets 112 are sliding connections so that the members 110 may be moved inwardly and outwardly. There are a plurality of transverse holes 122 in the horizontal part 114 of each of the brackets 112 and there are stop pins 124 movably receivable in the holes 122 for limiting inward movement of the iron support members 110.

There is means for moving irons inwardly and outwardly, such means comprising a pneumatic actuator 130 for each of the iron support members. The actuators are supplied with pneumatic or fluid pressure through lines or condiuts 132 and spring means, not shown, act on the pistons 134 of the actuators to effect return outward movement of the irons. The actuator cylinders are connected to suitable fixed support means by the support connecting means 136 and the piston rods thereof are operably connected to the iron support members 110 at 137. Irons 100 are supplied with icing from any suitable well-known mechanism which is operated by a motor 138. All of the irons have concave inner surfaces for engagement with the sides of the cakes.

Irons 100 have vertical slots 140 through which icing is forced onto the sides of the cakes when the irons are moved to their inward position. The irons 100 are unheated but the irons 102, 104 and 106 are heated, there being heating elements 144 therefor supplied with current by means of the wires 146. A thermostat, not shown, regulates the temperature of the irons 102, 104 and 106, the thermostat arrangement being of any well-known character.

The irons 102 are adapted to spread and smooth the frosting on the sides of the cakes and the irons 104 further smooth the frosting. Irons 106 provide finishing touches for the sides of the cakes, said irons combing the cake sides. As pointed out above, other types of finishing may be provided by the irons 106.

Icing is applied to the top of cake at station two by means of a plate 160 which is hollow and has an icing discharge slot 162 in the bottom facing. Plate 160 is provided with an upwardly extending axial rod 162' which extends through a bearing 164 carried by a platform of generally H shape and indicated generally at 166. The central portion 168 of the platform carries the bearing 164 and the arm 170 of the platform have openings therethrough adjacent the ends thereof for slidable reception of upstanding support rods 172 the lower ends of which are secured to longitudinally extending tables 174 carried by the frame of the apparatus, said tables being secured to the frame by any suitable well-known means. Rods 172 have collars 176 on their lower ends and these collars are secured to the tables 174 by welding, brazing or any other suitable means. Both pairs of rods 172 are provided with a plurality of longitudinally spaced openings 178 for reception of pins 180 upon which the platform is supported. By having a plurality of such holes or openings 178 the height of the platform may be variably adjusted to accommodate cakes of various sizes.

Rod 162' is provided with a washer 182 and a spring 184 reacts between the bearing 164 and the washer to urge the rod 162' and hence the plate 160 upwardly.

The motor 188 is supported on the platform 166 by means of a bracket 192 attached to the platform and having motor 188 secured to the upper end thereof. The motor is provided with a gear reduction mechanism carried in a gear box 196 with a connection to a shaft 198 carried by an offset portion 200 of said gear box. Shaft 198 is provided with a cam 202 and a sleeve 204 slidably receives the rod 162' and is tightened thereon at any desired adjustment position by means of a wing screw 206. The upper end of the sleeve 204 contacts the cam 202 and said cam is adapted to actuate the sleeve 204, rod 162' and plate 160 and thereby actuate the plate downwardly and permit its upward movement under the influence of spring 184.

There are various well-known machines on the market for supplying icing and hence the machine or source of icing is not shown. However, it is understood that the machine is operated by the motor 138. The icing machine is connected to the irons 100 by flexible conduits 210 and is connected to the plate 160 by a flexible conduit 212. It is to be understood that the irons 100 are hollow and icing discharged into said iron is discharged through the slots 140.

It is also to be understood that while the irons 100 and the plates 160 do not have means for heating same such means may be provided if desired for certain conditions.

Stations 4 and 5 are provided with heated plates 220 and 222, respectively. There is a platform, indicated generally at 224, which has a central portion 226 and arms 228, 230, 232 and 234. Arms 228, 230 and 232 have openings adjacent their ends for slidable reception of upstanding posts 236. Arm 234 has a tapped opening adjacent the end thereof for slidable reception of a screw 240 adapted to be rotated by an electric motor 242 through a gear system disposed in a gear box 244. The rotation of screw 240 effects raising or lowering of the platform 224 as desired, motor 242 being a reversible motor so that the platform may be adjustably raised or lowered to accommodate cakes of various heights.

There is a bearing or bushing 248 for each of the plates, said bearings being secured in openings provided therefor in the central portion 226 of the platform. The bushings may be secured by brazing, welding or other suitable means.

Each plate is provided with an upstanding axial rod 250 slidably disposed in its respective bearing. A motor 252 is mounted on the platform means of a motor support 254 and there are gear boxes 256 and 258 at the ends of the motor and attached thereto in any conventional manner. Cams 260 and 262 are mounted on respective shafts 264 and 266 which are operably connected by suitable gears in gear boxes with the drive shaft of the motor. Sleeves 270 slidably receive upper end portions of the rod 250 and are therefore adjustable to said rods. Such sleeves are secured in adjusted positions by means of the wing screws 272.

Each rod 250 is provided with a washer 274 which is secured thereon by any suitable means and a spring 276 reacts between the respective bearings 248 and said washers 274 to urge the plates and the rods upwardly so that the upper ends of the sleeves 270 engage the cams 260 and 262. When the motor 252 is energized it effects rotation of the cams 260 and 262 to actuate the plates 220 and 222 downwardly, the springs 276 urging the plates upwardly so that they will move upwardly as the cams rotate beyond their high points. The cams, as shown, rotate in a counter clockwise direction and the same is true of the cam 202.

As mentioned above, plates 220 and 222 are heated. There are heating elements, not shown, in said plates and said heating elements are supplied with electric current from a suitable source of current by means of wires 280.

To insure proper smoothing and finishing of the cakes, means is provided to clean the inner surfaces of the irons by a spray of air and water.

This cleaning means comprises a sprap head 284 for each of the irons and each spray head is positioned to direct a spray onto the surfaces to be cleaned when the irons are in their retracted position. There is an electric motor 286 to drive a pump 288 supplying a main conduit 290 with the mixture of air and water which is taken into the pump in any well known manner. From the main conduit 290 there are branch conduits 292, 294, 296 and 298 for cleaning the respective irons 100, 102, 104 and 106.

There is, of course, a spray head for each of the irons on each side of the apparatus and such spray heads may be supplied with the air and water mixture by the same pump 28 or, if desired, a separate system could be used on the opposite side. When the same pump is used the opposite side of the mechanism not shown in FIG. 1 is supplied with the cleaning mixture through a branch conduit 300 which is connected to the main conduit 290.

The spray heads are supported on their respective branch conduits and said branch conduits are attached to the downwardly extending arm of the adjacent longitudinally extending frame member 10 by means of brackets 302. The supply of the air and water mixture to the spray heads 284 is controlled by a valve 304.

*Operation*

Electric motors 66 and 286 are adapted to operate continuously. Electric motor 242 is controlled by a manual switch to vary the height of the platform 224 to adjust to various heights of cakes.

Electric motor is operated intermittently to move the cake supporting tables 56 from one station to the next station. At each station the tables stop while the various operations are performed at the respective stations.

The cakes to be frosted are placed on the tables 56 at the starting end of the apparatus which is shown as being at the left hand end thereof. Cakes are placed on the tables by hand as these tables move around to the top side of the thing. This occurs at station one and the cakes may be placed on the tables 56 during the period the tables are not moving forwardly.

A cake placed on a table at station one moves forwardly as the motor 40 is energized. The motor 40 is being energized when the cake has reached a position intermediate stations one and two because of the spacing of the other stations. After the cake has stopped at the intermediate position, the motor is again energized and moves the cake to station two at which time the motor 40 is de-energized so that the table carrying the cake is maintained stationary at station two as far as the forward motion thereof is concerned.

As the table carrying the cake reaches station two the driven disc 64 at the lower end of the table shaft 58 frictionally engages the driver disc 92 which effects rotation of the table 56 and the cake thereon.

When the cake carrying table 56 stops at station two pressure air is supplied to the actuators 130 to cause the members 110 to move inwardly and carry the irons inly to operative position, the irons 100 being positioned so as to apply icing to the sides of the cake.

At the same time the motor 188 is energized to effect actuation of the cam 202 which moves the plate 160 downwardly to a position closely adjacent the top of the cake and icing is applied to the cake top through the slot 162 in plate 160.

At the time the irons 100 move into operative or icing position and the plate 160 moves downwardly to icing position the icing mechanism is energized to force the requisite amount of icing through the irons 100 and plate 160 to apply the proper amount of icing to the sides and top of the plate.

The irons 100 and the plate 160 then move to their inoperative position and at the same time the motor 40 is energized to move the chains for advancing the cake carrying tables to the next station at which time the motor 40 is then de-energized. The plate carrying the cake is then at station three and the irons 102 are moved inwardly to smooth the frosting on the sides of the cake. At this station the driven friction disc 64 is in operable engagement with the driver disc 92 at station three so that the cake is rotated and the irons 102 are smoothing position for smoothing the icing on the sides of the cake.

It is to be understood that as the tables 56 reach their upper position at the beginning or starting ends of the apparatus, a cake to be frosted is placed thereon so that there is continually cakes to be iced moved along the apparatus. When the cake at station three is being operated upon to smooth the icing on the sides, there is a cake at station two to the sides and top of which icing is being applied.

After the cake at station three has been operated upon, the irons 102 are moved by the springs of the actuator to their inoperative position and the motor 40 is again energized to move the plates to the next station, the cake that has been at station three is then moved to station four. The chain mechanism then stops as motor 40 is de-energized and the irons are moved inwardly. The irons 104 further smooth the icing at the sides of cake, it being understood that the driver disc 92 at station four then effects rotation of the table 56 at that station so that the icing will be further smoothed by the irons 104 and the plate 220 which has been actuated to the lower operative position by the cam 260.

After the icing of the cake at station four has been operated upon, the irons are retracted and the plate 220 raised. Motor 40 is then energized again to move the tables forwardly to the next station.

The cake that has been at station four is now at station five and the irons 106 are moved inwardly to comb the sides of the cake at this station which is being rotated by means of the driver disc 92 at station five and the disc 64 of the table upon which the cake rests. The plate 222 is then moved downwardly by the cam 262 driven by motor 252 and imprints or places a design or decoration on the top of the cake.

When the irons have been moved to the retracted position and the plate 222 has been raised the motor 40 is again energized to move the tables to the next station. The cake that has just been iced is now at station six, the terminal end of the apparatus and is removed by hand or may be removed by a suitable power operated mechanism.

Each time the irons are moved to the retracted position after having operated on a cake, the inner surfaces of the irons are cleaned by the air and water mixture described above. When the irons have been retracted the valve 304 is open and the air and water mixture is discharged through the spray head onto the inner surfaces of the irons. This operation is for a limited period of time and when the desired amount of air and water have been sprayed onto the irons the valve 304 closes.

Referring to FIG. 8 there is shown the wiring diagram for controlling various parts of the apparatus.

The motor 40 for intermittently advancing the tables 56 is controlled by a normally closed time delay switch 350 having an actuating part 352 operated by switch operating members 354 secured at predetermined places on one of the chains 30. The location of said switch operating members is such that the switch 350 is actuated to the open position when the tables 56 are at their stations and should be stationary. The switch 350 is so timed that the irons 100, 102, 104 and 106 will have time to move to their operating positions and be retracted so that the cakes will clear them when the tables start to move to the next succeeding station.

One side of the motor 40 is supplied with electric current through a wire 358 from a suitable source of current. There is also a wire 360 from said source of current and said wire is operably connected to the time delay switch 350 from which there is a wire 362 leading to the motor 40.

There is also a normally open time delay switch 364 which is operated by the same switch operating members 354 and this switch is closed at the same time the switch 350 is opened. A wire 366 connects the switch 364 with the main wire 358 and said switch 364 is operably connected by wires 374 and 376 to one side of respective solenoids 368 which in turn are operably connected to respective valves 370, the latter being opened when solenoids 368 are energized. Solenoids 368 have their other sides connected to main wire 360 by wires 378, 380, 382 and 384.

Valves 370 have a connection with a source of pressure air for operating the actuators 130 to move the irons 100, 102, 104 and 106 to their operating positions. When the solenoids 368 open valves 370 the pressure air is supplied to said actuators and said valves are kept open as long as the time delay switch 364 is closed. The time of switch 364 is synchronized with the time delay switch 350 so that said irons are moved to their inner operating positions when the motor 40 is de-energized by opening of switch 350.

Motor 138 operates the usual icing supply mechanism and has one side operably connected to time delay switch 364 by a wire 386 connected to wire 376 which in turn is connected with wire 374. The other side of motor 138 is connected through wires 380 and 378 to the main wire 360.

Motor 252 has one side operably connected to time delay switch 364 by wires 390 and 374 while motor 188 is connected with said time delay switch by having a connection 392 with wire 390.

Thus the actuators 130, motor 138 and motors 188 and 252 are all rendered operable upon closing of time delay switch 364 which is so timed that the instrumentalities controlled by it are rendered operable when time delay switch 350 is open and motor 40 is rendered inoperable. Time delay switch 364 opens a sufficient time before switch 350 closes to permit the icing applying, spreading or smoothing, and finishing irons and plates to at least clear the cakes before the tables start to move again.

The air-water spray mixture is turned on when valve 304 is opened, said valve being opened by a solenoid 400 having an operable connection with said valve. Solenoid 400 is controlled by a normally closed time delay switch 402 connected to said solenoid by wires 404 and 406. Time delay switch 402 is connected to main wire 358 by a wire 408 and is connected to wire 362 by a wire 410 so that when time delay switch closes to energize motor 40 current is supplied to time delay switch 402 which then supplies current to solenoid 400 to energize same for opening valve 304. The air and water mixture or mist is then sprayed onto the irons 100, 102, 104 and 106. The time the spraying continues is determined by the time delay switch 402 which remains closed a sufficient time for the spray to clean the irons, said switch 402 opening before the irons start to move inwardly.

I claim:

1. Cake icing apparatus, comprising:
   (A) support means;
   (B) cake table conveying means supported by said support means and having at least a portion movable from a loading end to a terminal end of the apparatus;
   (C) a plurality of cake carrying tables carried by said table conveying means, said tables being rotatable on respective vertical axes;
   (D) means for intermittently moving said table conveying means, said tables successively stopping at an icing applying station;
   (E) means for rotating said tables when stopped at said icing applying station;
   (F) elements for applying icing to the sides and tops of cakes at said icing station, the icing applying elements having a normally inoperative position spaced away from cakes at said station but being movable to an operative position adjacent the sides and top of a cake at said icing applying station when a table is stopped at said station;
   (G) and means for moving said icing applying elements between said positions, said icing applying elements being at the inoperative position when the table conveying means is moving forwardly but being moved to the operative position when a table is stopped at said icing station.

2. The invention defined by claim 1, wherein the support means comprises a frame which includes a pair of laterally spaced members; the cake table conveying means comprises a pair of endless chains rotatably mounted on sprockets adjacent the ends of the frame, and cake table supporting cross members having their ends secured to respective chains, said cross members being spaced apart a predetermined distance along the chains, the cake carrying tables being rotatably mounted on said cross members; there being a plurality of stations uniformly spaced apart a predetermined distance which corresponds to the spacing of the cross members and hence the tables, at least one intermediate station forwardly of the icing station being an icing smoothing station, and another station forwardly of the smoothing station being a finishing station.

3. The invention defined by claim 2, wherein the elements for applying icing to the sides of cakes comprise a pair of oppositely arranged irons movable inwardly toward a cake and outwardly away from a cake, said irons having inner walls with icing discharge slots therein, said irons also spreading icing on the sides of the cakes as the latter are rotated with rotation of the tables, one of the icing applying elements having a flat bottom wall facing the top of a cake at the icing station, said icing applying element having an opening in the bottom wall for discharge of icing onto the top of a cake, said element for applying icing to the top of the cake being nonrotatable so as to also spread icing on the top of the cake as the latter is rotated and said element for applying icing to the top of the cake being movable upwardly and downwardly.

4. The invention defined by claim 3, including oppositely arranged side smoothing irons at the intermediate station, said irons being normally at outward inoperative positions but moved inwardly to operative smoothing positions when the tables are stationary; there also being a nonrotatable top smoothing plate at the intermediate station movable from an upper inoperative position to a downward operative, finishing position; the elements at the finishing station for finishing the sides of cakes comprise a pair of oppositely arranged irons movable from outward inoperative positions to inward operative finishing positions whereat the inner sides thereof engage icing on the sides of a cake at the finishing station, and the element at the finishing station for the top of the cake comprises a disc-like plate having a configuration on the under side for placing a corresponding configuration on the top of a cake, the finishing element being movable from an upward inoperative position to a downward, operative position.

5. The invention defined by claim 4, including means for heating at least the smoothing and the finishing elements.

6. The invention defined by claim 5, wherein the means for intermittently moving the table conveying means comprises an electric motor, and a time delay switch for controlling said motor, said time delay switch being normally closed and opening when cake carrying tables are at the various stations; and means on the table conveying means for actuating the time delay switch to the open position for stopping said conveying means when tables are at the stations.

7. The invention defined by claim 6, wherein the means for moving the irons for the sides of cakes comprises fluid operated actuators, valve means for controlling pressure fluid to the actuators, and solenoids for controlling said valves; the means for actuating the plate elements for the tops of the cakes comprise electric motors and cams operated by said motors; and a normally open time delay switch intermittently closed by the same means which intermittently open the normally closed time delay switch is opened, said normally open time delay switch effecting energization of said solenoids and the electric motors for the plate elements for the tops of the cakes, and vice versa.

8. The invention defined by claim 7, including means for cleaning the inner faces of the irons when the latter are at outer inoperative positions.

9. The invention defined by claim 8, wherein the means for cleaning the inner faces of the irons includes spray heads adjacent each iron and directed to spray the inner faces of the irons when the latter are at their outer inoperative positions, conduit means for connecting said heads with a source of an air and water mixture, a valve for controlling said conduit means, a solenoid for controlling said valve, and a normally open time delay switch for controlling said solenoid, said time delay switch closing when the first mentioned time delay switch closes.

10. The invention defined by claim 7, wherein there is means for supplying icing to the irons and plate at the icing station, said means including an electric motor controlled by the normally open time delay switch and operative to operate the icing supplying means when said motor is energized by closing of said normally open time delay switch which remains closed a predetermined time for supplying the desired amount of icing to the irons and plate at the icing station.

11. The invention defined by claim 2, wherein the cake tables have depending shafts and the means for rotating said tables includes a driven friction disc on each shaft, a rotatable driving friction disc at each station at an operative angle to the driven discs, and means for rotating the driving disc, said driven discs making operative engagement with the driving discs as said driven discs come into the respective stations.

References Cited

UNITED STATES PATENTS

| | | | |
|---|---|---|---|
| 577,566 | 2/1897 | Vander Linda | 107—8 X |
| 1,436,223 | 11/1922 | Weimar | 118—218 |
| 1,818,412 | 8/1931 | Litty et al. | 118—18 |
| 2,191,268 | 2/1940 | Zeun | 107—7 |
| 2,405,879 | 8/1946 | Fredricksen. | |
| 2,674,223 | 4/1954 | King | 118—16 |
| 3,207,088 | 9/1965 | McDonald. | |

WALTER A. SCHEEL, *Primary Examiner.*

JOSEPH SHEA, *Assistant Examiner.*

U.S. Cl. X.R.

107—8; 118—16, 17, 18, 411